US007014050B1

(12) United States Patent
Ogata et al.

(10) Patent No.: US 7,014,050 B1
(45) Date of Patent: *Mar. 21, 2006

(54) FILTER CARTRIDGE

(75) Inventors: Satoshi Ogata, Amagasaki (JP); Youzou Higuchi, Osaka (JP); Osamu Yamaguchi, Moriyama (JP)

(73) Assignee: Chisso Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/600,203

(22) PCT Filed: Nov. 19, 1999

(86) PCT No.: PCT/JP99/06488

§ 371 (c)(1),
(2), (4) Date: Aug. 9, 2000

(87) PCT Pub. No.: WO00/30730

PCT Pub. Date: Jun. 2, 2000

(30) Foreign Application Priority Data

Nov. 25, 1998 (JP) ................................ 10-334528
Mar. 30, 1999 (JP) ................................ 11-088791

(51) Int. Cl.
*B01D 27/06* (2006.01)

(52) U.S. Cl. .................. 210/489; 210/493.4; 210/496; 210/497.1

(58) Field of Classification Search ............. 210/497.1, 210/493.4, 494.1, 489, 496, 505, 510.1; 428/36.3; 55/520, 527; 442/401, 350, 409
See application file for complete search history.

(56) References Cited

U.S. PATENT DOCUMENTS

| | | | | |
|---|---|---|---|---|
| 3,334,752 A | | 8/1967 | Matravers | |
| 3,532,800 A | | 10/1970 | Wyly et al. | |
| 3,834,547 A | | 9/1974 | Renjilan | |
| 4,100,009 A | | 7/1978 | Nakajima et al. | |
| 4,278,551 A | | 7/1981 | Hou et al. | |
| 5,652,041 A | | 7/1997 | Burger et al. | |
| 5,721,180 A | | 2/1998 | Pike et al. | |
| 6,090,731 A | * | 7/2000 | Pike et al. | 442/409 |

FOREIGN PATENT DOCUMENTS

| | | | |
|---|---|---|---|
| EP | 831161 A1 | * | 3/1988 |
| EP | 313920 | | 5/1989 |
| EP | 466381 | | 1/1992 |
| JP | 36878/1979 | | 3/1979 |
| JP | 168443/1985 | | 6/1987 |

(Continued)

OTHER PUBLICATIONS

English Language translation of Japanese Patent 4-45811.*

*Primary Examiner*—Matthew O. Savage
(74) *Attorney, Agent, or Firm*—Hamre, Schumann, Mueller & Larson, P.C.

(57) ABSTRACT

A filter cartridge comprising a strip, long fiber non-woven fabric which comprises a thermoplastic fiber and in which at least a part of fiber intersections is adhered, which is wound around a perforated cylinder in a twill form, has made it possible to obtain a cylindrical filter cartridge which is excellent in a liquid-passing property, a filter life and a stability in a filtering accuracy. The thermoplastic fiber constituting the above long fiber non-woven fabric is particularly preferably a thermally adhesive composite fiber comprising a low melting point resin and a high melting point resin and having a melting point difference of 10° C. or more between those of both resins.

12 Claims, 9 Drawing Sheets

FOREIGN PATENT DOCUMENTS

| | | |
|---|---|---|
| JP | 15004/1988 | 4/1988 |
| JP | 1-115423 | 5/1989 |
| JP | 25607/1989 | 5/1989 |
| JP | 115423/1989 | 5/1989 |
| JP | 317513/1989 | 12/1989 |
| JP | 52090/1991 | 11/1991 |
| JP | 4-45810 | 2/1992 |
| JP | 45810/1992 | 2/1992 |
| JP | 45811/1992 | 2/1992 |
| JP | 131412/1992 | 12/1992 |
| JP | 131413/1992 | 12/1992 |
| JP | 2815/1993 | 1/1993 |
| JP | 9055/1993 | 3/1993 |
| JP | 18614/1993 | 3/1993 |
| JP | 73307/1991 | 3/1993 |
| JP | 6-7767 | 3/1994 |
| JP | 7767/1994 | 3/1994 |
| JP | 60034/1995 | 3/1995 |
| JP | 328356/1995 | 12/1995 |
| JP | 2000-279727 | 10/2000 |

* cited by examiner (A) (B) (C)

FILTER CARTRIDGE

TECHNICAL FIELD

This invention relates to a filter cartridge for filtering a liquid, more specifically to a filter cartridge prepared by slitting a long fiber non-woven fabric comprising thermoplastic fibers in strips and winding the slit fabric in a twill form.

BACKGROUND ART

Various filters for clarifying a fluid are presently developed and produced. Among them, cartridge-type filters (hereinafter called filter cartridges) are widely used in the industrial field, for example, for removing suspended particles in industrial liquid materials, removing cakes flowing out of a cake filtering apparatus and clarifying industrial water.

Several kinds of structures of a filter cartridge have so far been proposed. The most typical one is a bobbin winder-type filter cartridge, which is a cylindrical filter cartridge prepared by winding a spun yarn as a filter material on a perforated cylindrical core in a twill form and then fluffing the spun yarn. This type has long been used due to inexpensiveness and easiness in production. Another type of structure includes a non-woven fabric-laminated type filter cartridge. This is a cylindrical filter cartridge prepared by winding several kinds of non-woven fabrics such as a carding non-woven fabric stepwise and concentrically on a perforated cylindrical core. A recent advanced technique in a non-woven fabric production has allowed some of them to be put to practical use.

However, the above-mentioned filter cartridges have several defects. For example, in the bobbin winder-type filter cartridge for trapping foreign matters by means of fluffs of fluffed spun yarns and also in gaps of the spun yarns, it is difficult to control the size and form of the fluffs and gaps. This limits size and amount of the foreign matters that can be trapped. Further, constitutional fibers of a spun yarn, which is made from short fibers, fall away when fluid flows onto the filter cartridge. Furthermore, in producing a spun yarn, a trace amount of a surfactant is often applied onto a surface of material short fibers to prevent the short fibers from sticking to a spinning machine by electrostatic charge or the like. Filtering a liquid by means of a filter cartridge using surfactant-coated spun yarns may bring adverse effects on the cleanness of liquid, such as foaming of the liquid, and increase in TOC (total organic carbon), COD (chemical oxygen demand) and the electric conductivity. In addition, a spun yarn is produced by spinning short fibers as already mentioned, for which at least two steps of forming and spinning short fibers are required. Thus, use of the spun yarn will sometimes increase a price of the product.

In a filter in which a broad non-woven fabric is wound around a perforated cylinder in layers as shown in FIG. 1, a so-called non-woven fabric-laminated type filter cartridge, its performance depends on the non-woven fabric used. A non-woven fabric is produced mostly by a method in which short fibers are confounded by means of a carding machine or an air laid machine and then subjecting them, if necessary, to heat treatment by means of a hot-air heater or a heating roll, or a method in which a non-woven fabric is directly prepared, such as a melt blowing method and a spun bonding method. However, any machines used for producing non-woven fabrics, such as a carding machine, an air laid machine, a hot-air heater, a heating roll, a melt blowing machine and a spun bonding machine, may cause, for example, uneven basis weights of a non-woven fabric in a lateral direction of a machine. Accordingly, a filter cartridge of poor quality will be produced. Also, use of a more advanced manufacturing technique to avoid such unevenness sometimes raises the production cost. Moreover, production of one kind of non-woven fabric-laminated type filter cartridges needs two to six kinds of non-woven fabrics, and different non-woven fabrics are needed depending on the kind of a filter cartridge. Thus, the production cost will increase in some cases.

Several methods have been proposed in order to solve such problems of conventional filter cartridges.

For example, Japanese Patent Publication No. 15004/1988 (U.S. Pat. No. 4,278,551) proposes a porous winding cartridge filter comprising a tubular member formed from a superimposed winding body of a continuous yarn bundle, whose surface has been modified with cationic colloidal silica. According to this gazette, the filter has a higher foreign matter-removing rate than that of conventional bobbin winder filters due to the cationic silica colloid. However, use of cationic silica colloid is considered to affect cleanness of a liquid as described above.

Further, Japanese Utility Model Publication No. 7767/1994 proposes a filter cartridge in which a filter material obtained by squashing a tape-shaped paper having porosity while twisting, thereby squeezing it to control a diameter thereof to about 3 mm is wound around a porous internal cylinder in a close twill. This method is advantageous in that a winding pitch can be gradually increased from the porous internal cylinder toward the outside. However, the filter material needs to be squashed and squeezed, so that foreign matters are trapped primarily between the winding pitches of the filter material. Accordingly, it is less expected to trap foreign matters by the filter material itself as is the case of a conventional bobbin winder type filter using spun yarns which traps foreign matters by means of fluffs. This blocks the surface of the filter to shorten the filter life or brings about the poor liquid-passing property in a certain case. Japanese Patent Publication No. 25607/1989, Japanese Utility Model Publication No. 52090/1991 and Japanese Patent Application Laid-Open No. 317513/1989 concern the invention analogous to the aforementioned publication, and all these publications involve the similar problems.

Alternatively, Japanese Patent Application Laid-Open No. 115423/1989 proposes a filter in which strings obtained by slitting a cellulose spun bonded non-woven fabric into strips and passing them through narrow holes to twist them are wound around a bobbin having a lot of drilled pores. It is considered that this method shall make it possible to prepare a filter having a higher mechanical strength and being free of dissolution in water and elution of a binder, as compared with a conventional roll tissue filter prepared by winding tissue paper in a roll form, which is produced from α-cellulose prepared by refining a coniferous pulp. However, the cellulose spun bonded non-woven fabric used for this filter has a papery form and thus a too high rigidity, so that it is less expected to trap foreign matters by the filter material itself as is the case of a conventional bobbin winder type filter using spun yarns which traps foreign matters by means of fluffs. Further, the cellulose spun bonded non-woven fabric is liable to swell in a liquid due to its papery form. Swelling may bring about various problems such as a decrease in a filter strength, a change in a filtering accuracy, a deterioration in a liquid-passing property, a reduction in a filter life and the like. Adhesion at fiber intersections of the cellulose spun bonded non-woven fabric are mostly conducted by a certain chemical treatment. Such adhesion is often unsatisfactory, causing a change in a filtering accuracy or falling of fiber chips, so that a stable filtering performance is difficult to achieve. Other inventors propose in Japanese Utility Model Application Laid-Open No. 36878/1979 a filter using a tape-shaped cellulose non-woven fabric without using a binder, but the filter has the same problem.

Further, Japanese Patent Application Laid-Open No. 45810/1992 proposes a filter prepared by winding a slit non-woven fabric comprising composite fibers in which 10% by weight or more of structural fibers is divided ones of 0.5 denier or less on a porous core cylinder to provide the fiber density of 0.18 to 0.30. This method is advantageously used to trap fine particles contained in a liquid by means of fibers having a small fineness. However, in order to divide the composite fibers, a stress needs to be applied using, for example, high-pressure water, and it is difficult to evenly divide the fibers all over the non-woven fabric by means of high-pressure water processing. If not evenly divided, there occurs a difference in a scavenged particle diameter between a well-divided portion and an insufficiently divided portion of the non-woven fabric, and this may roughen the filtering accuracy. Further, the stress applied for dividing sometimes lowers a strength of the non-woven fabric, and this may cause reduction of the resulting filter strength and frequent deformation of the filter during use; or possible change of the void ratio of the filter may reduce the liquid-passing property. Further, the reduced strength of the non-woven fabric makes it difficult to control a tension in winding around a porous core cylinder, and hence the difficulty in exact control of the void rate may arise. Further, a spinning technique required for producing easily divisible fibers and an increased operation cost in producing thereof lead to an increased production cost of the filter. Such a filter would be usable in a certain field such as the pharmaceutical industry and the electronic industry which require a high filtering performance, if the above mentioned problems of the filtering performance are solved. However, such a filter is considered to be difficult to use in cases in which inexpensive filters are requested such as the filtering of swimming pool water and a plating liquid for the plating industry. Analogous inventions include Japanese Patent Application Laid-Open No. 45811/1992, Japanese Utility Model Application Laid-Open No. 131412/1992, Japanese Utility Model Application Laid-Open No. 131413/1992, Japanese Utility Model Application Laid-Open No. 2715/1993 and Japanese Utility Model Application Laid-Open No. 18614/1993, all of which involve the problems described above.

Japanese Patent Application Laid-Open No. 60034/1995 proposes a filter prepared by winding a non-twisted, flat tape-shaped fiber around a porous core cylinder, the tape-shaped fiber being prepared by sterically crimping an eccentric sheath-core type of combined short fibers comprising two components with different heat shrinkability. According to this gazette, the filter has less bubbling and less discharged fiber chips than those of conventional filters. However, fibers constituting this filter have no adhesion between yarns, though they have a steric crimping property. Because of this, trapped foreign matters may easily move into the filtrate when a filtering pressure is raised. Japanese Patent Application Laid-Open No. 328356/1995, analogous to the above application, also involves the problem described above.

An object of the present invention is to solve the problems described above. It has been found, as a result of investigations, that a cylindrical filter cartridge which is excellent in a liquid-passing property, a filter life and a stability of a filtering accuracy can be obtained by winding a long fiber non-woven fabric comprising thermoplastic fibers on a perforated cylinder in a twill form. This finding has led to the present invention.

DISCLOSURE OF THE INVENTION

The present invention is composed of:

(1) A filter cartridge comprising a strip, long fiber non-woven fabric which comprises a thermoplastic fiber and in which at least a part of fiber intersections is adhered, wherein the strip, long fiber non-woven fabric is wound around a perforated cylinder in a twill form.

(2) The filter cartridge as described in item (1), wherein the thermoplastic fiber constituting the long fiber non-woven fabric is a thermally adhesive composite fiber comprising a low melting point resin and a high melting point resin, the difference in a melting point of both the resins being 10° C. or more.

(3) The filter cartridge as described in item (2), wherein the low melting point resin is linear low density polyethylene and the high melting point resin is polypropylene.

(4) The filter cartridge as described in any of items (1) to (3), wherein the long fiber non-woven fabric is bonded by thermal compression by means of a heat embossing roll.

(5) The filter cartridge as described in item (2) or (3), wherein the fiber intersections of the long fiber non-woven fabric are bonded by hot blast.

(6) The filter cartridge as described in any of items (1) to (3), wherein the strip, long fiber non-woven fabric is twisted.

(7) The filter cartridge as described in any of items (1) to (3), wherein the strip, long fiber non-woven fabric is formed into a pleated matter having 4 to 50 pleats and wound around a perforated cylinder in a twill form.

(8) The filter cartridge as described in item (7), wherein at least a part of the pleats of the above pleated matter is non-parallel.

(9) The filter cartridge as described in item (7), wherein the pleated matter has a void rate of 60 to 95%.

(10) The filter cartridge as described in any of items (1) to (3), wherein the filter cartridge has a void rate of 65 to 85%.

(11) The filter cartridge as described in any of items (1) to (3), wherein the long fiber non-woven fabric has a slit width of 0.5 cm or more, and a product of the slit width (cm) and the basis weight (g/m$^2$) is 200 or less.

Figure 1:
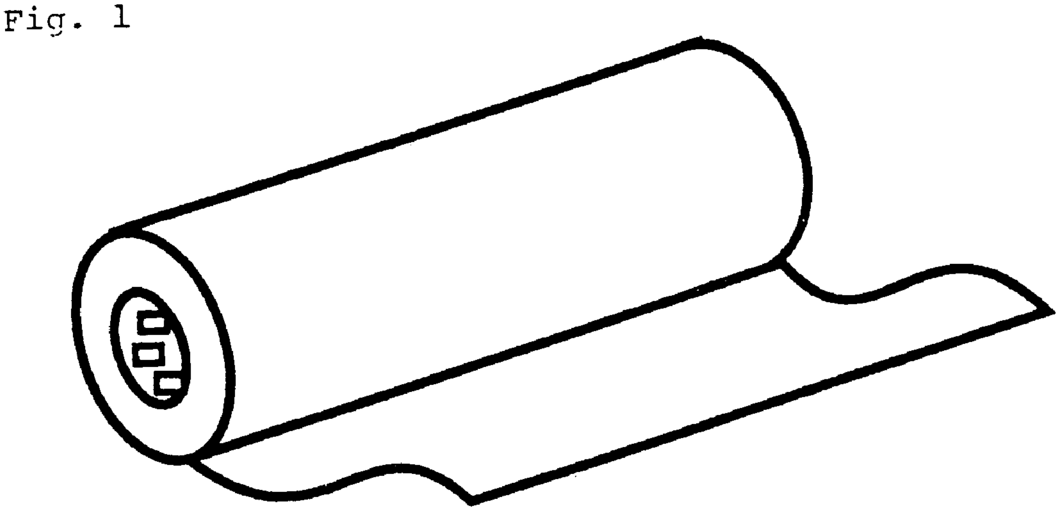
FIG. 1 is an illustration of a non-woven fabric which is wound in a layer form.

The codes shall be explained below:

1: a part where strong thermal compression bonding by an embossing pattern is applied.
2: a part where only weak thermal compression bonding by deviating from an embossing pattern is applied
3: foreign matters
4: foreign matters passing through a part where only weak thermal compression bonding by deviating from an embossing pattern is applied
5: a strip, long fiber non-woven fabric or a converged matter thereof
6: a traverse guide of a narrow hole
7: a bobbin
8: a perforated cylinder
9: a filter cartridge
10: a traverse guide
11: a traverse guide
12: external controlling guide
13: an internal controlling guide
14: a small hole
15: a pleated matter
16: a pleat-forming guide
17: a comb-shaped pleat-forming guide
18: a narrow rectangular hole
19: an oval figure of a minimum area involving a strip, long fiber non-woven fabric-converged matter
20: a space between a certain strip, long fiber non-woven fabric-converged matter and another strip, long fiber non-woven fabric-converged matter wound on the underneath layer
21: an internal layer
22: a fine filtering layer
23: an external layer
24: a strip, long fiber non-woven fabric-converged matter
25: a long fiber constituting a spun bonded non-woven fabric
26: a particle
27: a short fiber constituting a short fiber non-woven fabric

BEST MODE FOR CARRYING OUT THE INVENTION

The embodiment of the present invention shall specifically be explained below.

All thermoplastic resins capable of being melt-spun can be used for the thermoplastic resin used in the present invention. Examples include polyolefin resins such as polypropylene, low density polyethylene, high density polyethylene, linear low density polyethylene and copolymerized polypropylene (for example, binary or multi-components copolymers comprising propylene as a primary component with ethylene, butene-1,4-methylpentene-1 and the like); polyester resins such as polyethylene terephthalate, polybutylene terephthalate and low melting point polyesters thereof copolymerized with addition of isophthalic acid besides terephthalic acid as an acid component; polyamide resins such as nylon 6 and nylon 66; and thermoplastic resins such as polystyrene resins (atactic polystyrene and syndiotactic polystyrene), polyurethane elastomers, polyester elastomers and polytetrafluoroethylene. Further, functional resins can also be used so as to provide a filter cartridge with a biodegradability derived from biodegradable resins such as a lactic acid base polyester. Further, polyolefin resins and polystyrene resins which are polymerized using metallocene catalysts are preferably used for a filter cartridge, taking advantage of the characteristics of metallocene resins such as improvements in a strength of a non-woven fabric and a chemical resistance, and a reduction in a production energy. Also, those resins may be blended for use in order to control a heat adhesion property and a rigidity of a long fiber non-woven fabric. When a filter cartridge is used for filtering an aqueous solution of room temperature, polyolefin resins such as polypropylene are preferably used from the viewpoints of a chemical resistance and a cost. When used for a solution of a relatively high temperature, polyester resins, polyamide resins or syndiotactic polystyrene resins are preferred.

If the fibers constituting the long fiber non-woven fabric used in the present invention are composite fibers comprising a low melting point resin and a high melting point resin whose melting point difference is 10° C. or more, preferably 15° C. or more, heat adhesion in the fiber intersections of the non-woven fabric is strengthened. The melting point used herein means a peak temperature observed when determining a melting point of a resin by means of a differential scanning type calorimeter (DSC), while in the case of a resin with no distinct peak, it means a flow-starting temperature. The melting point difference has no specific upper limit, which corresponds to a temperature difference between the melting points of the highest melting point and the lowest melting point among the thermoplastic resins capable of being melt-spun. In the case of a resin having no melting point, the flow-starting temperature is defined as a melting point. Strong heat adhesion in the fiber intersections of non-woven fabrics used for filter cartridges will allow less particles which have been trapped in the vicinity of the fiber intersections to flow out, when a filtering pressure and a flow amount of a solution are elevated, and will result in a less deformation of the filter cartridge. Further, even if a substance contained in a filtrate deteriorate the fibers, the strong heat adhesion can reduce probability of the fibers falling, and thus it is desirable.

A combination of the low melting point resin and the high melting point resin in the composite fibers shall not specifically be restricted as long as the melting point difference is 10° C. or more, preferably 15° C. or more, which includes linear low density polyethylene/polypropylene, high density polyethylene/polypropylene, low density polyethylene/polypropylene, copolymer of propylene with other $\alpha$-olefin/polypropylene, linear low density polyethylene/high density polyethylene, low density polyethylene/high density polyethylene, various polyethylenes/thermoplastic polyester, polypropylene/thermoplastic polyester, copolymerized polyester/thermoplastic polyester, various polyethylenes/nylon 6, polypropylene/nylon 6, nylon 6/nylon 66 and nylon 6/thermoplastic polyester. Among them, a combination of linear low-density polyethylene/polypropylene is preferably used, since rigidity and a void rate of the long fiber non-woven fabric can readily be controlled diring a step of fusing fiber intersections in producing the non-woven fabric. When a filter cartridge is applied to a solution of a relatively high temperature, a combination of low melting point polyester/polyethylene terephthalate can suitably be used, the polyester being prepared by copolymerizing ethylene glycol with terephthalic acid and isophthalic acid.

Figure 15:
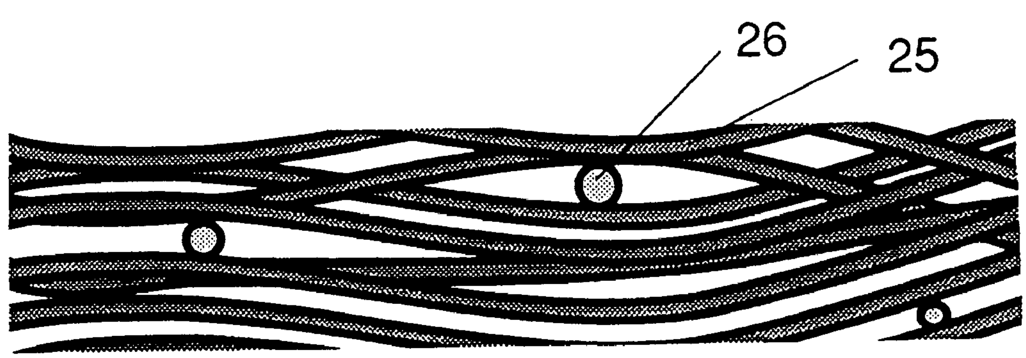
FIG. 15 is a conceptual diagram of a spun bonded non-woven fabric.
Figure 16:
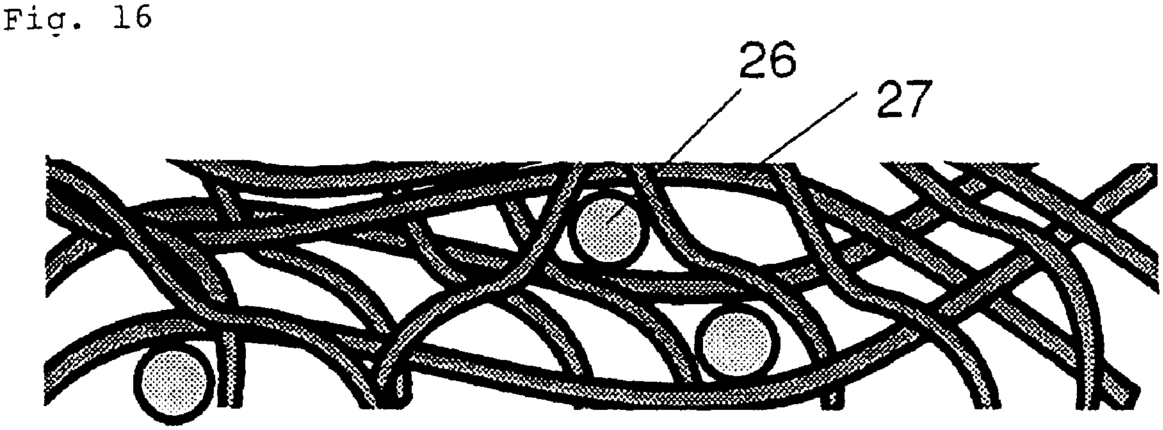
FIG. 16 is a conceptual diagram of a short fiber non-woven fabric.

The long fiber non-woven fabric used in the present invention is one obtained by a spun bonding method and the like. The long fiber non-woven fabric produced by the spun bonding method and the like has a fiber direction aligned along a machine direction as shown in FIG. 15, so that a hole constituted by fibers 25 becomes long and narrow, and a maximum size of the passing particle 26 is rather small. In contrast with this, a non-woven fabric comprising short fibers obtained by a carding method and the like has a fiber direction not fixed as shown in FIG. 16, so that a hole constituted by fibers 27 has a shape close to a circle or a square, and a maximum size of the passing particle 26 is larger than that of a long fiber non-woven fabric produced by the spun bonding method, even the two has the same aperture rate. A liquid-passing property of filter materials is determined substantially by the aperture rate if the fiber diameters are the same, and therefore the long fiber non-woven fabric produced by the spun bonding method can provide a filter having an excellent liquid-passing property. This effect is reduced when an adhesive that clogs holes of a filter is used as a binder, and therefore use of a cellulose spun bonded non-woven fabric is not desirable. Further, the cellulose spun bonded non-woven fabric is weak in strength, and therefore use of the fabric causes the problem that the holes constituted by the fibers are liable to be deformed if the filtering pressure rises due to clogging of the filter or the like. On the other hand, an average single yarn fineness of the long fiber non-woven fabric used in the present invention may vary depending on applications of the filter cartridge and the kind of the resins and is preferably in the range of 0.6 to 3000 dtex. The fineness of 3000 dtex or more provides no difference from a case of a non-woven fabric obtained by merely bundling continuous yarns, thus making it no longer advantageous to use a long fiber non-woven fabric. The non-woven fabric can obtain a satisfactory strength by raising the fineness to 0.6 dtex or more, thus allowing easy processing into a pleated matter by a method described later, and the resulting filter cartridge also has an increased strength. If a fiber with a fineness less than 0.6 dtex is spun by a current spun bonding method, a processability of a nozzle used and a spinnability of fibers may be deteriorated, thereby bringing an increase in cost of a spun bonded non-woven fabric produced.

The structural fibers of the long fiber non-woven fabric do not necessarily have a circular cross section, and yarns having different cross sections can also be used. In the latter case, a filter cartridge having a higher accuracy than that in case of fibers having a circular cross section, while at the same liquid-passing property, can be produced, because an amount of trapped fine particles increases as a surface area of the filter becomes larger.

When the long fiber non-woven fabric is made hydrophilic by incorporating a hydrophilic resin such as polyvinyl alcohol into a raw material resin for the fabric or subjecting the surface thereof to plasma treatment, the liquid-passing property can be enhanced in case of an aqueous solution, and therefore, a filter using such resin is preferred for filtering an aqueous solution.

A heat bonding method of the fiber intersections in the long fiber non-woven fabric used in the invention includes a thermal compression bonding method by means of an apparatus such as a thermal embossing roll and a heat flat calender roll and a method using a heat treating machine of a hot blast-circulating type, a heat through-air type, an infrared heater type or a vertical hot blast-blowing type. Among them, a method using a thermal embossing roll is preferred, because it can elevate a production rate of a non-woven fabric, provides a good productivity and can reduce a cost.

Figure 2:
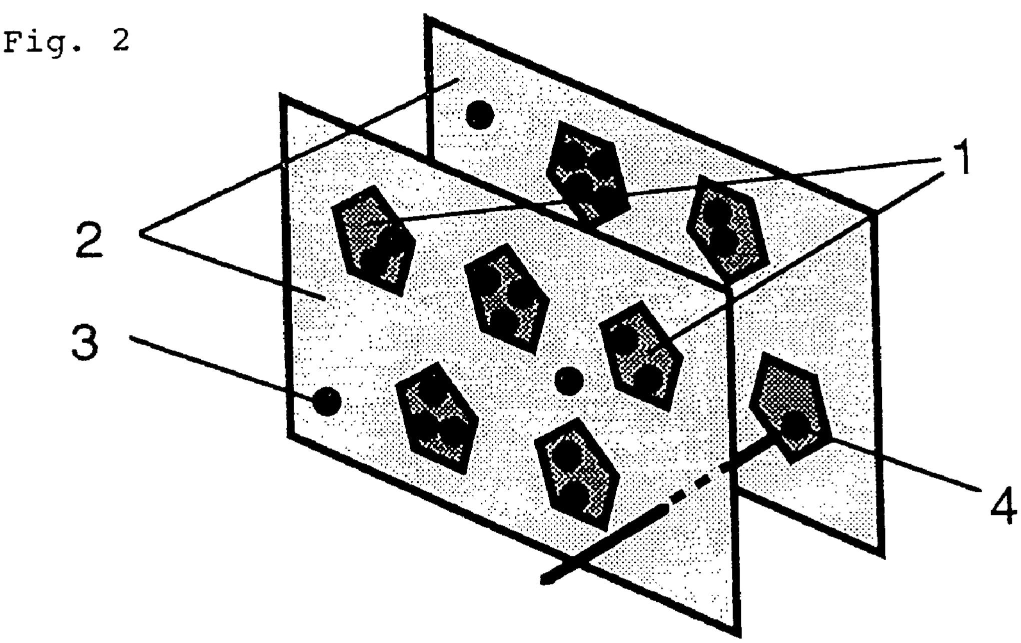
FIG. 2 is an illustration of trapping foreign matters by means of an embossing pattern of a long fiber non-woven fabric.

Further, as shown in FIG. 2, a long fiber non-woven fabric produced by the method using a thermal embossing roll has part 1 where strong thermal compression bonding by an embossing pattern is applied and part 2 where only weak thermal compression bonding by deviating from an embossing pattern is applied. This makes it possible to trap a lot of foreign matters 3, 4 in the part 1, and a part of the foreign matters in the part 2, while the remaining foreign matters can pass through the long fiber non-woven fabric to move to the following layer. Preferred is this deep layer-filtering structure, in which even the inside of the filter is utilized.

In this case, an embossing patterned area is preferably from 5 to 25%. Setting the lower limit of this area to 5% can enhance the effect exerted by the heat bonding of the fiber intersections, and setting the upper limit to 25% can control the rigidity of the non-woven fabric not to become too high. Further, parts of foreign matters are allowed to easily pass through the long fiber non-woven fabric, and the foreign matters passed are trapped in the inside of the filter. This can prolong the filter life.

The non-woven fabric may be processed into the form of a filter cartridge by a method described later, followed by the thermal compression bonding of the fiber intersections by means of an infrared ray or steam treatment, or the fiber intersections can be chemically adhered using an adhesive such as an epoxy resin. The aperture rate in the latter is lower as compared with a case by thermal bonding, so that the liquid-passing property is sometimes lowered.

One of the characteristics of the present invention is to use a thermally adhesive composite fiber for the thermoplastic fiber constituting the non-woven fabric. Use of the thermally adhesive composite fiber is advantageous in that the adhesion points remains smooth because only a part of single yarns is molten by thermal adhesion and that the risk of interfusing the resin into the filtrate due to breakage of the adhesion points is diminished. A process for producing this thermally adhesive composite fiber non-woven fabric is disclosed, for example, in Japanese Patent Application Laid-Open No. 88460/1998.

A basis weight of the long fiber non-woven fabric, i.e., a weight per unit area of the non-woven fabric, is preferably 5 to 200 $g/m^2$. If the value is smaller than 5 $g/m^2$, an amount of the fiber is reduced, resulting in an increased unevenness in the non-woven fabric or a reduced strength of the non-woven fabric, or occasionally difficulty in thermal bonding of the fiber intersections. On the other hand, the value larger than 200 $g/m^2$ will render the rigidity of the non-woven fabric too much increased, so that the fabric is difficult to wind around a perforated cylinder in a twill form in a later stage.

Next, the long fiber non-woven fabric is formed into strips. Methods usable for obtaining the strips include one in which a non-woven fabric is directly produced in strips by controlling a spinning width, but preferably a method in which a broad, long fiber non-woven fabric is slit into strips. In the latter case, the slit width, which varies depending on the basis weight of the non-woven fabric used, is preferably 0.5 cm or more. If the width is smaller than 0.5 cm, there is a possibility of cutting the non-woven fabric on slitting. Moreover, it becomes difficult to control the tension when winding the strip, non-woven fabric in a twill form. Further, when producing filters with the same void rate, the winding time is longer and the productivity is lower. On the other hand, an upper limit of the slit width varies depending on the basis weight, and a value of the slit width (cm)×basis weight ($g/m^2$) is preferably 200 or less. The value larger than 200 will render the rigidity of the non-woven fabric excessively increased, so that winding of the non-woven fabric on a perforated cylinder in a twill form becomes difficult at a later stage. Further, the increased amount of the fiber makes it difficult to wind the non-woven fabric densely. Also, when producing a non-woven fabric in the form of strips by controlling the spinning width, the preferred ranges of the basis weight and the non-woven fabric width are the same as those in the case of preparing the strips by slitting.

Figure 3:
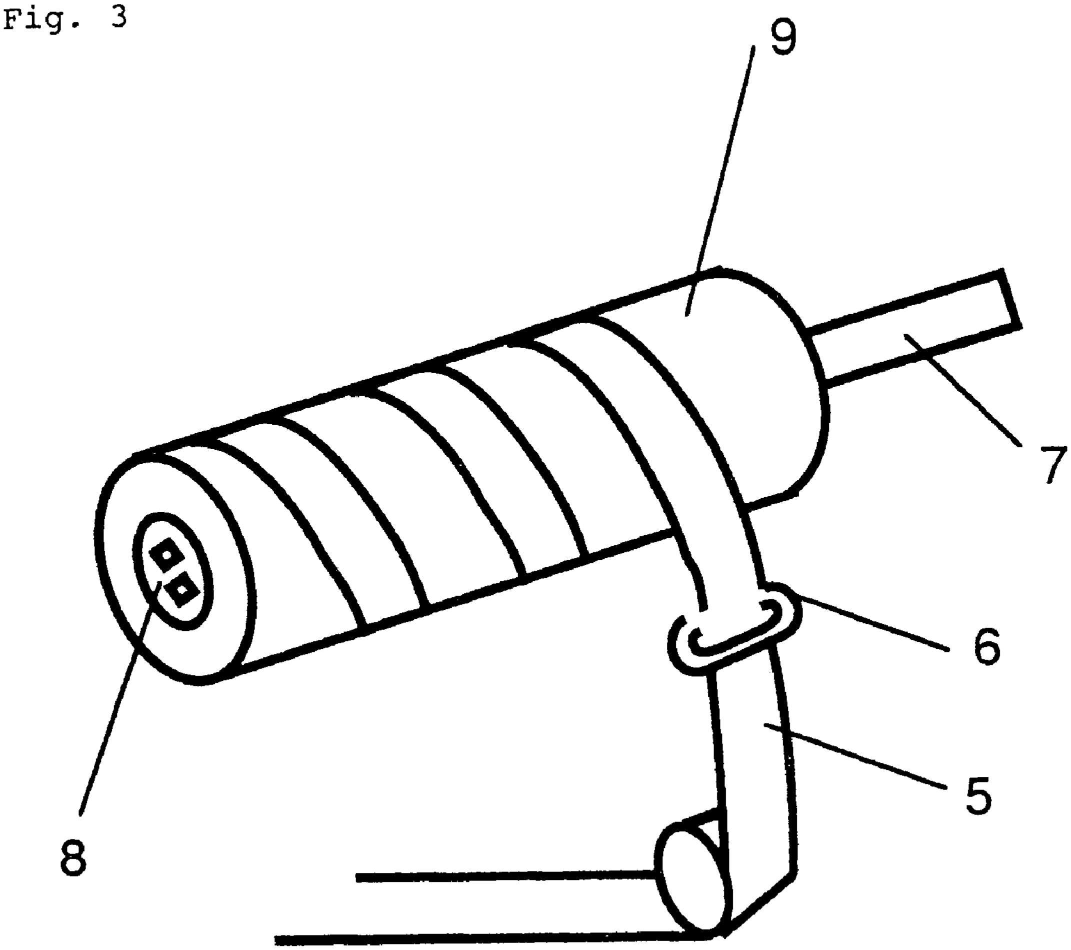
FIG. 3 is an illustration of winding a strip, long fiber non-woven fabric as it is, without processing.

This long fiber non-woven fabric may be wound in a twill form after processing by a method, which shall be described later, or it may be wound as it is without processing. One embodiment of the production process is shown in FIG. 3. A winder conventionally used for a bobbin winder type filter cartridge can be used for the winding machine. A strip, long fiber non-woven fabric 5 fed passes through a narrow-holed traverse guide 6, which moves with twilling while traversing, and then is wound around a perforated cylinder 8 mounted on a bobbin 7 to form a filter cartridge 9. The filter cartridge produced by this process is very dense and has a fine accuracy. However, it is difficult in this process to change the winding number to control the filtering accuracy.

Figure 4:
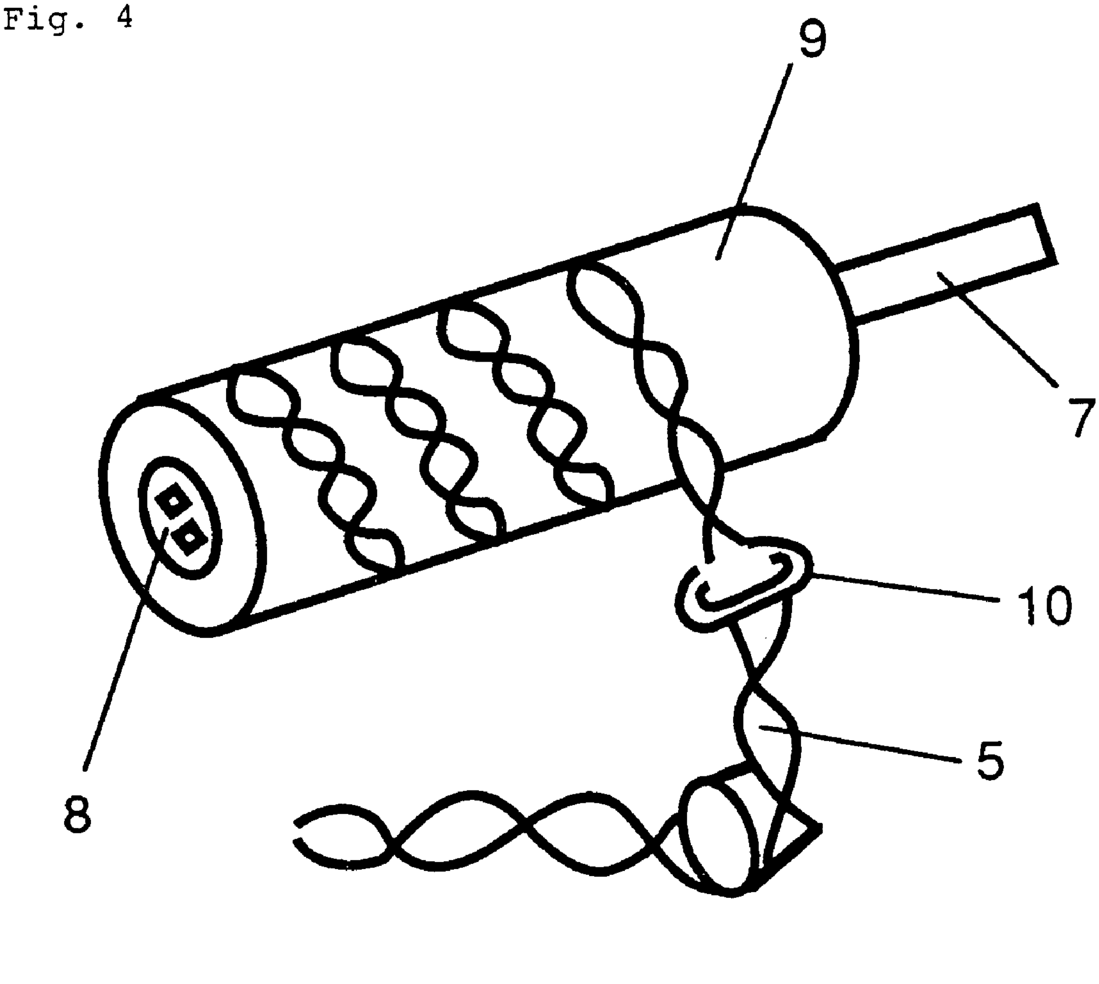
FIG. 4 is an illustration of winding a strip, long fiber non-woven fabric with twisting.

On the other hand, this strip, long fiber non-woven fabric can be twisted and then wound. One embodiment of the production process is shown in FIG. 4. Also in this case, a winder conventionally used for a bobbin winder type filter cartridge can be used for the winding machine. The non-woven fabric becomes apparently thick by twisting, and therefore a traverse guide 10 has preferably a larger hole diameter than that in the case of FIG. 3. By twisting a non-woven fabric, an apparent void rate of the non-woven fabric can be changed depending on a twisting number per unit length or a twisting strength, so that the filtering accuracy can be controlled. The twisting number in this case falls preferably in a range of 50 to 1000 times per meter of the strip, long fiber non-woven fabric. If this value is smaller than 50 times, the twisting effect is scarcely obtained. On the other hand, the value larger than 1000 times will provide the filter cartridge produced with a rough liquid-passing property. Accordingly, both are not preferred.

It is more preferred to converge the strip, long fiber non-woven fabric described above by any method and then wind it around a perforated cylinder. Such a method include one in which the strip, non-woven fabric may be passed merely through a small hole to be converged or one in which the cross-sectional form of the strip, long fiber non-woven fabric may be pre-molded by means of a pleat-forming guide and then passed through a small hole to be processed into a pleated matter. Use of the latter method makes it possible to control a ratio of a traversing speed of the traverse guide to a rotating speed of the bobbin to change the winding pattern, so that filter cartridges having various performances can be produced from the same kind of the strip, long fiber non-woven fabric.

Figure 5:
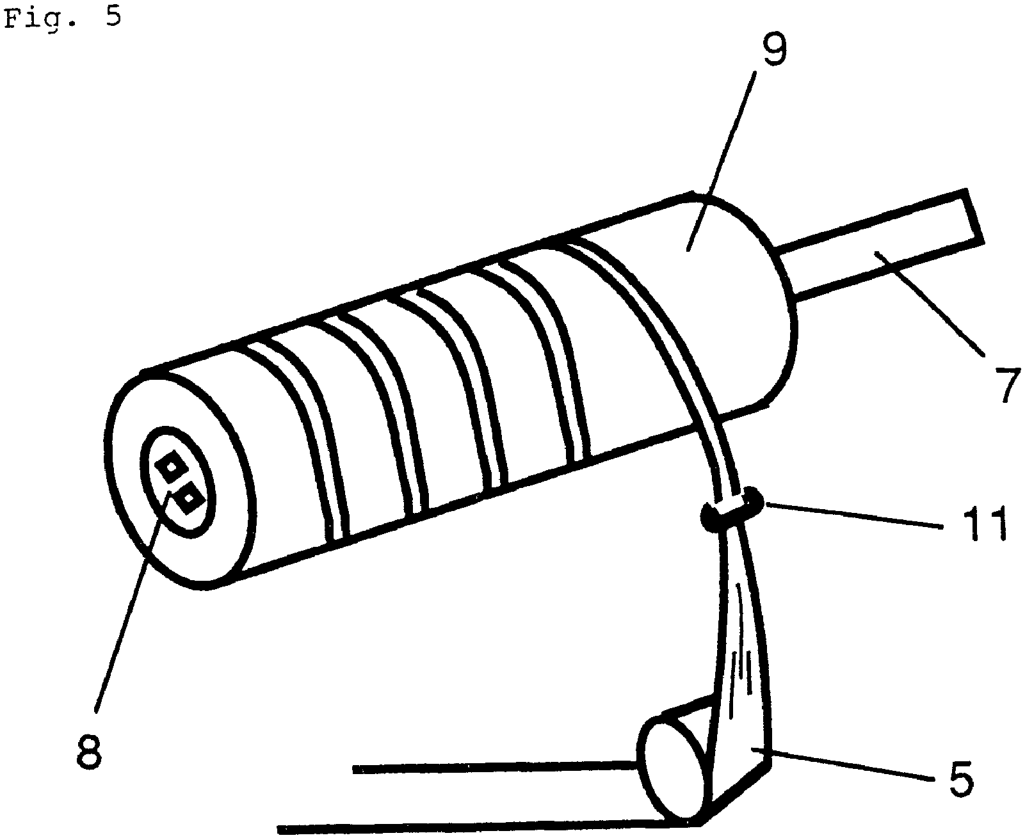
FIG. 5 is an illustration of passing a strip, long fiber non-woven fabric through a small hole to converge it before winding.

One embodiment of a production process in which the non-woven fabric is passed merely through a small hole for converging the strip is shown in FIG. 5. Also in this case, a winder conventionally used for a bobbin winder type filter cartridge can be used for the winding machine. In FIG. 5, the hole of a traverse guide 11 turned into a small hole, thereby converging the strip, long fiber non-woven fabric, but a guide of a small hole may be provided at a yarn passage in front of the traverse guide 11. The diameter of the small hole varies depending on the basis weight and the width of the non-woven fabric used and falls preferably in the range of 3 to 10 mm. If this diameter is smaller than 3 mm, a friction between the non-woven fabric and the small hole is increased, so that the winding tension becomes too high. On the other hand, the value larger than 10 mm may not render the converging size of the non-woven fabric stabilized.

Figure 6:
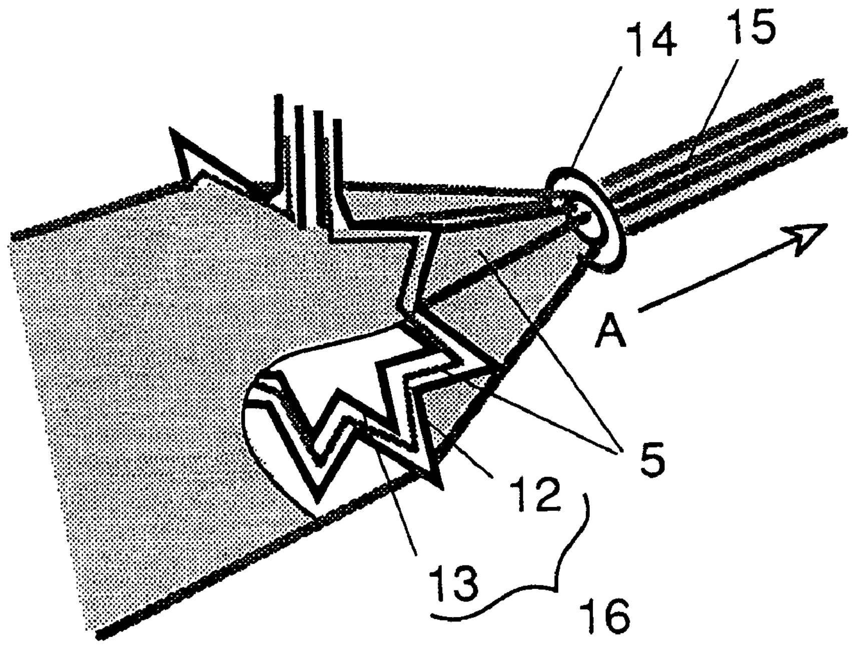
FIG. 6 is an illustration of processing a strip, long fiber non-woven fabric into a pleated matter by means of a pleat-forming guide.

Shown in FIG. 6 is one embodiment of a production process in which the cross-sectional form of the strip, long fiber non-woven fabric is pre-molded by means of a pleat-forming guide and then processed into a pleated matter. Also in this case, a winder conventionally used for a bobbin winder type filter cartridge can be used for the winding machine. In this process, the cross-sectional form of the strip, long fiber non-woven fabric 5 is pre-molded through a pleat-forming guide 16 and then passed through a small hole 14 to be formed into a pleated matter 15. The pleated matter 15 is drawn toward a direction A to pass through a traverse guide and to wind around a perforated cylinder to prepare a filter cartridge. In FIG. 6, a heavy line represents a fold of the non-woven fabric, and a gray part represents the non-woven fabric.

Figure 7:
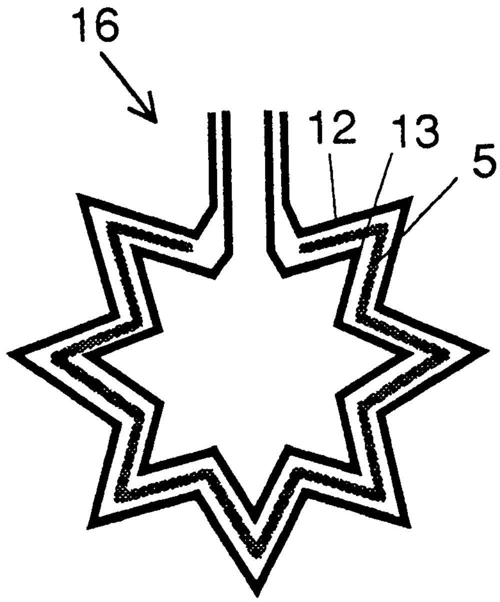
FIG. 7 is a cross section of a pleat-forming guide used in the present invention.
Figure 8:
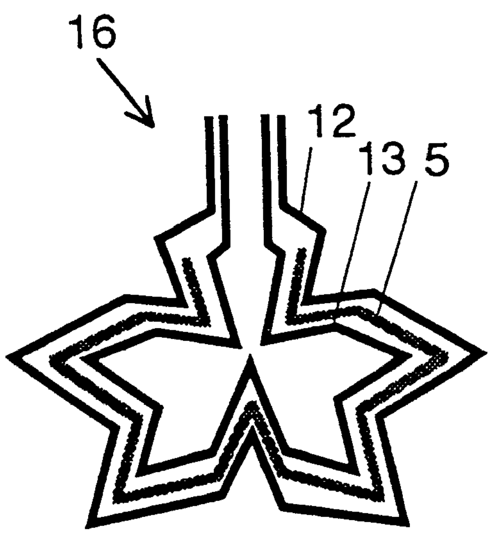
FIG. 8 is a cross section of another pleat-forming guide used in the present invention.
Figure 9:
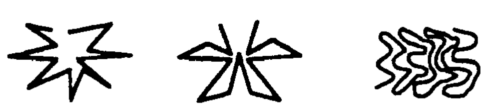
FIG. 9 is an illustration of a cross-sectional shape of a pleated matter with non-parallel pleats.

Next, the pleat-forming guide described above shall be explained. Usually, the pleat-forming guide is prepared by subjecting the surface of a processed round bar having a major diameter of about 3 to 10 mm to the 1 fluorocarbon resin treatment in order to prevent friction with a non-woven fabric. Examples of its form are shown in FIGS. 7 and 8. In these examples, the pleat-forming guide 16 comprises an external controlling guide 12 and an internal controlling guide 13. The form of the pleated forming guide 16 shall not specifically be restricted and is preferably one in which the non-woven fabric is converged in such a manner that the cross-sectional form of the pleated matter produced through this guide shows no parallel pleats. Examples of the cross-sectional form of the pleated matter thus produced are shown in FIGS. 9 (A), (B) and (C), but shall not be restricted to these. In the most preferred embodiment of the present invention, the non-woven fabric is converged to form the pleated matter in which at least a part of the pleats is non-parallel. That is, when the pleats is partially non-parallel as shown in the cross-sectional forms in FIG. 9, the pleated matter can keep a stronger form-holding power even when a filtering pressure is applied from a vertical direction as shown by an arrow, as compared with the cases in FIGS. 10 (A) and (B), in which almost all of the pleats are parallel, so that the filtering performance in the original pleated form can be maintained. In the case where the pleats are non-parallel, the ability to control the pressure loss of the filter cartridge is better than that of the base where the pleats are parallel, and therefore it is particularly preferred that the pleated matter has the cross-sectional form showing non-parallels pleats. The number of the guide is not limited to one, and it is preferable that several guides with different forms and sizes are arranged in series to gradually change the cross-sectional form of the strip, long fiber non-woven fabric, so that the cross-sectional form of the pleated matter can be kept uniform, and unevenness in the quality can be removed.

In the present invention, when the strip, long fiber non-woven fabric is formed into the pleated matter and then wound around the perforated cylinder, the final pleat number of the pleated matter is 4 to 50, preferably 7 to 45. If the pleat number is less than 4, the effect of expanding a filtering area by pleating is poor. On the other hand, if the pleat number exceeds 50, too small pleats make the production of the filter cartridge difficult, and tend to adversely affect the filtering performance to lower.

Figure 11:
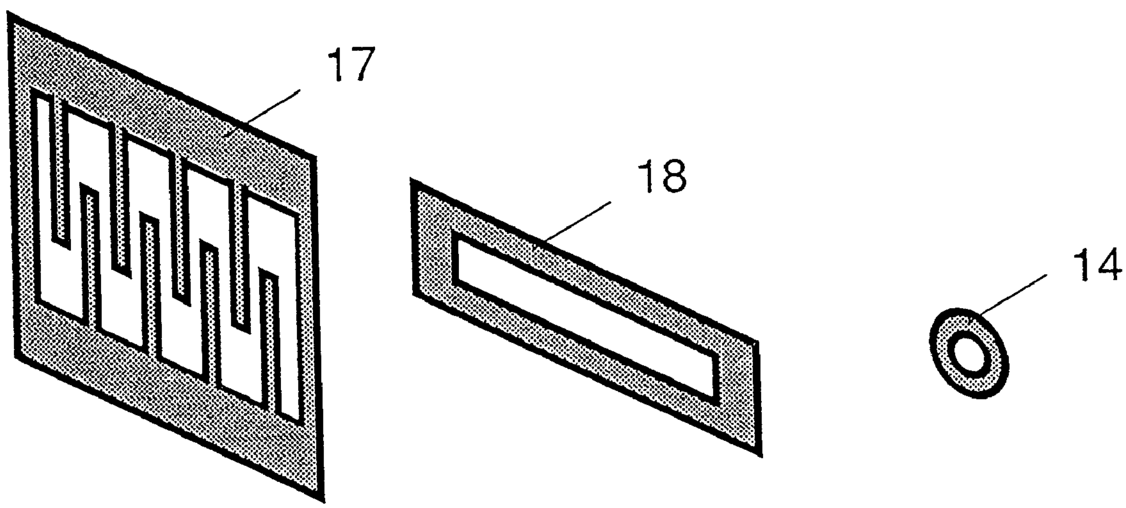
FIG. 11 is an illustration of a location of a pleat-forming guide, a narrow rectangular hole and a small hole.

A comb-shaped pleat-forming guide 17 as shown in FIG. 11, for example, can be used to provide the long fiber non-woven fabric with many pleats, and then the non-woven fabric is passed through a narrower rectangular hole 18 to be deformed so as to provide more pleats, which are non-parallel at random.

The pleated matter 15 which has passed through the small hole 14 described above can be heat-processed by means of hot blast or an infrared heater to fix the cross-sectional form of the pleated matter. This step is not requisite, but it is desirable in case of making a complicated cross-sectional form of the pleated matter or in case of using the strip, long fiber non-woven fabric having a high rigidity, because the cross-sectional form is liable to be broken and deviated from the designed form.

Figure 12:
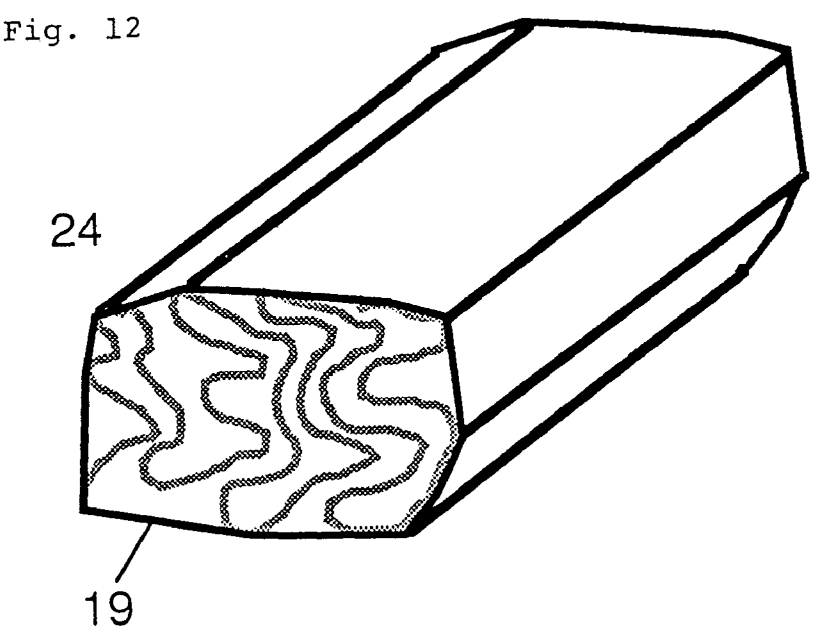
FIG. 12 is a partial cutout perspective of the pleated matter according to the present invention.

The void rate of the strip, long fiber non-woven fabric which has been converged or the pleated matter, used in the present invention, (hereinafter referred to as a strip, long fiber non-woven fabric-converged matter) shall be explained. First, the cross-sectional area of the strip, long fiber non-woven fabric-converged matter is defined, as shown in FIG. 12, by the area of the smallest oval FIG. 19 (the oval figure means a polygon in which all the respective internal angles fall within 180 degrees) containing a strip, long fiber non-woven fabric-converged matter 24. The strip, long fiber non-woven fabric-converged matter is cut to a prescribed length, for example, a length as large as 100 times of the square root of the cross-sectional area and the void rate is defined according to the following equation:

(Apparent volume of strip, long fiber non-woven fabric-converged matter)=(Cross-sectional area of strip, long fiber non-woven fabric-converged matter)×(Cut length of strip, long fiber non-woven fabric-converged matter);

(Real volume of strip, long fiber non-woven fabric-converged matter)=(Weight of cut strip, long fiber non-woven fabric-converged matter)/(Density of raw material for strip, long fiber non-woven fabric-converged matter);

(Void rate of strip, long fiber non-woven fabric-converged matter)={1−(Real volume of strip, long fiber non-woven fabric-converged matter)/(Apparent volume of strip, long fiber non-woven fabric-converged matter)}×100 (%).

The void rate defined according to the equation is preferably 60 to 95%, more preferably 85 to 92%. Setting the lower limit of the value to 60% makes it possible to inhibit the strip, long fiber non-woven fabric-converged matter from becoming excessively dense, to sufficiently control the possible pressure loss when used for a filter cartridge and to more elevate the foreign matter-trapping efficiency of the strip, long fiber non-woven fabric-converged matter. Further, setting the upper limit to 95% makes it easy to wind the converged matter at a later stage and makes it possible to lessen the possible deformation of the filter by loaded pressure when used for a filter cartridge. An example of a method for controlling this includes controlling of the winding tension and adjusting the guide form of the pleat-forming guide.

Further, when producing the above strip, long fiber non-woven fabric-converged matter, granular activated carbon or ion exchange resins may be present as long as they do not damage the effects of the present invention. In this case, in order to fix granular activated carbon or ion exchange resins, they may be adhered by means of a suitable binder either prior to or after converging the strip, long fiber non-woven fabric or processing it into a pleated matter, or they may be first added and then thermally adhered to the structural fibers of the long fiber non-woven fabric by heating.

The strip, long fiber non-woven fabric-converged matter should not necessarily be produced by a continuous process, if any contrivance to retain the cross-sectional form is made, and it may be first wound around a suitable bobbin and then rewound by means of a winder.

The method of winding the strip, long fiber non-woven fabric shall be explained. A perforated cylinder having a diameter of about 10 to 40 mm and a length of 100 to 1000 mm is installed to a bobbin of this winder, and the strip, long fiber non-woven fabric (or the strip, long fiber non-woven fabric-converged matter) passed through a yarn passage of the winder is fixed at an end part of the perforated cylinder. The perforated cylinder functions as a core of a filter cartridge, and the material and the form thereof shall not specifically be restricted as long as it has a strength which is endurable to external pressure applied in filtering and the pressure loss is not markedly high. It may be, for example, an injection-molded article obtained by processing polyethylene or polypropylene into a net type cylinder as is the case with a core used for a conventional filter cartridge or ones obtained by processing ceramics and stainless steel in the same manner. Alternatively, other filter cartridges such as a filter cartridge subjected to pleat-folding processing and a filter cartridge of a non-woven fabric-winding type can be used as a perforated cylinder. The yarn passage of the winder is waved in twill form by means of a traverse cum disposed parallel to the bobbin, so that the strip, long fiber non-woven fabric is wound around the perforated cylinder while waving in a twill form. The winding conditions in this case can be set up according to those in producing a conventional bobbin winder type filter cartridge. Initial speed of the bobbin may be set to, for example, 1000 to 2000 rpm, and the feeding speed may be controlled to apply a tension in winding the non-woven fabric. The void rate of the filter cartridge can be changed by the tension in this case. Further, the tension in winding is controlled to make the void rate of an internal layer small, and the void rate of an intermediate layer to an external layer gradually large as the non-woven fabric is wound around. In particular, when the strip, long fiber non-woven fabric is first formed into the pleated matter and then is wound around the perforated cylinder, there can be provided a filter cartridge having an ideal filtering structure owing to a difference in rough and dense structures formed in the external layer, the intermediate layer and the internal layer in combination with a deep layer-filtering structure formed by the pleats of the pleated matter. The filtering accuracy can be changed by controlling a ratio of the traversing speed of the traverse cum to the rotating speed of the bobbin, thereby changing the winding pattern. As a patterning method, a known method used in a conventional bobbin winder type filter cartridge can be used. If the filter has a fixed length, the pattern can be shown in terms of the winding number. When a space 20 (FIG. 13) between a certain yarn (the strip, long fiber non-woven fabric in case of the present invention) and a yarn wound on an underneath layer is broad, the filtering accuracy is roughened. On the contrary, when the space is narrow, the filtering accuracy becomes fine. Using these methods, the strip, long fiber non-woven fabric is wound around the perforated cylinder 8 (FIG. 13) to form a filter cartridge having a major diameter 1.5 to 3 times as large as that of the perforated cylinder. This may be used for the filter cartridge 9 (FIG. 13) as it is, or a gasket of foamed polyethylene having a thickness of 3 mm may be stuck on an end surface of the filter cartridge to improve an adhesive property to housing.

The filter thus prepared has a void rate preferably in the range of 65 to 85%. The value smaller than 65% will render the fiber density too high, so that the liquid-passing property is reduced. On the contrary, the value larger than 85% will render the strength of the filter cartridge to reduce and often cause deformation of the filter cartridge when a high filtering pressure is applied.

Figure 14:
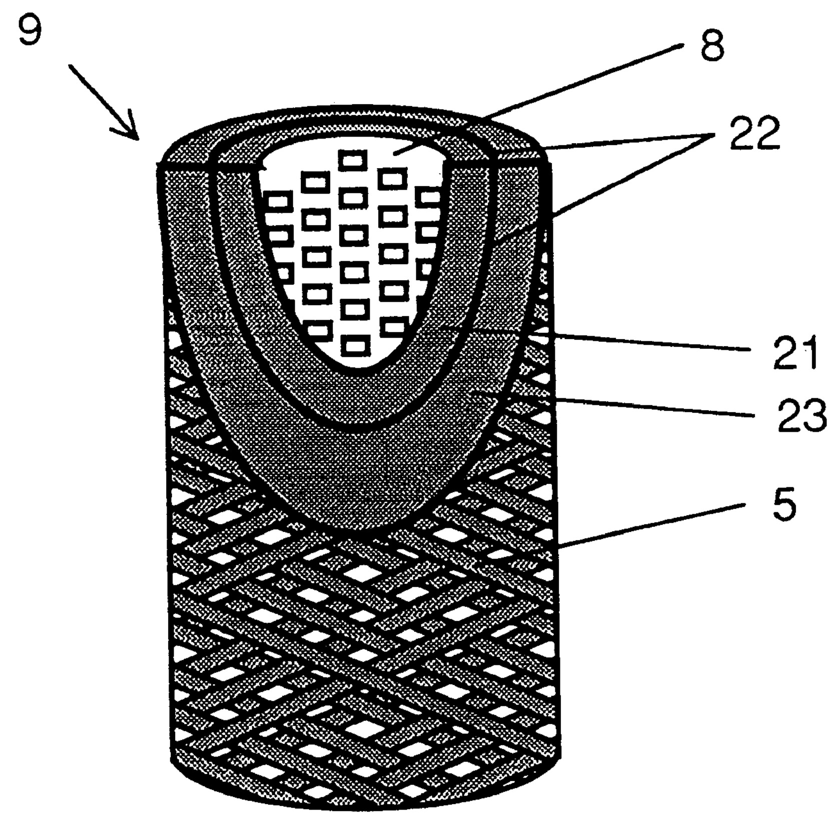
FIG. 14 is a cross section of the filter cartridge according to the present invention.

The liquid-passing property can be improved by providing the strip, long fiber non-woven fabric with cut or by perforating it. In this case, the number of the cut is preferably 5 to 100 per 10 cm of the non-woven fabric, and the perforation area is preferably 10 to 80%. The filtering performance can be controlled by winding plural sheets of the strip, long fiber non-woven fabric or winding it together with other yarns such as a spun yarn. Further, as shown in FIG. 14, a filter cartridge can be formed by winding the non-woven fabric in the following manner; the non-woven fabric 5 is wound around the perforated cylinder 8 in a traversing manner to form the internal layer 21 with a suitable diameter; subsequently, a wide non-woven fabric is wound around the internal layer in a layer form to form the fine filtering layer 22; then the non-woven fabric 5 is wound again around the filtering layer in a traversing manner to form the external layer 23. When a filter cartridge having a rough accuracy is prepared using the wide non-woven fabric which is wound in a non-layer form with a broad space between yarns, a maximum flowing-out diameter of particles sometimes becomes extremely large, while by using the wide non-woven fabric wound in a layer form, the maximum flow-out diameter of particles can finely be controlled as required.

The present invention shall be explained below in detail with reference to examples and comparative examples, but the present invention shall not be restricted to these examples. In the respective examples, the physical properties and the filtering performances of the filters were evaluated by the methods described below. Basis weight and thickness of non-woven fabric:

The non-woven fabric having the area of 625 $cm^2$ was cut off and weighed. The weight was converted to a weight per square meter to define a basis weight. Further, the thickness of the cut non-woven fabric was measured at 10 optional points, and the values at 8 points excluding the maximum value and the minimum value were averaged to define the thickness ($\mu$m) of the non-woven fabric.

Fineness of Non-Woven Fabric:

The non-woven fabric was sampled at 5 spots at random, and they were photographed through a scanning type electron microscope. 20 fibers per spot were selected at random to measure the diameters of the fibers, and an average value thereof was defined as the fiber diameter ($\mu$m) of the non-woven fabric. The fineness (dtex) was determined from the following equation using the fiber diameter thus obtained and the density (g/cubic centimeter) of the raw material resin of the non-woven fabric:

$$(\text{Fineness})=\pi(\text{Fiber diameter})^2\times(\text{Density})/400$$

Number of Pleats in Pleated Matter:

The cross-sectional form of the pleated matter was fixed by an adhesive and then cut at 5 optional spots to photograph the cross sections thereof. The fold number of the strip, long finer non-woven fabric was counted from the photographs, counting either of inverted V folding and V folding as one, and a half of the average number in the five cut spots is defined as the number of pleats.

Cross-Sectional Area and Void Rate of Strip, Long Fiber Non-Woven Fabric-Converged Matter:

The cross-sectional form of the strip, long fiber non-woven fabric-converged matter was fixed by an adhesive and then cut at 5 optional spots to photograph the cross sections thereof. The photographs were subjected to image analysis to determine the cross-sectional area of the strip, long fiber non-woven fabric-converged matter. Further, another 10 cm length of the strip, long fiber non-woven fabric-converged matter was cut at a different spot to determine the void rate from its weight and the above cross-sectional area using the following equation:

(Apparent volume of strip, long fiber non-woven fabric-converged matter)=(Cross-sectional area of strip, long fiber non-woven fabric-converged matter)×(Cut length of strip, long fiber non-woven fabric-converged matter);

(Real volume of strip, long fiber non-woven fabric-converged matter)=(Weight of strip, long fiber non-woven fabric-converged matter)/(Density of raw material for strip, long fiber non-woven fabric-converged matter);

(Void rate of strip, long fiber non-woven fabric-converged matter)={1−(Real volume of strip, long fiber non-woven fabric-converged matter)/(Apparent volume of strip, long fiber non-woven fabric-converged matter)}×100 (%).

Yarn Space:

A space (shown by numeral 20 in FIG. 13) between the strip, long fiber non-woven fabric-converged matter (or the matters wound around the perforated cylinder such as the strip, long fiber non-woven fabric and the spun yarn in the following examples) situated on the surface and the strip, long fiber non-woven fabric-converged matter adjacent thereto was measured at 10 spots per one filter cartridge, and the average thereof was calculated to obtain the yarn space.

Void Rate of Filter Cartridge:

The major diameter, the minor diameter, the length and the weight were measured to determine the void rate using the following equation. In order to determine the void rate of the filter itself, the major diameter of the perforated cylinder was used for the value of the minor diameter, and a value obtained by deducting the weight of the perforated cylinder from the weight of the filter cartridge was used for the value of the weight:

$$(\text{Apparent volume of filter})=\pi\{(\text{Major diameter of filter})^2-(\text{Minor diameter of filter})^2\}\times(\text{Filter length})/4;$$

(Real volume of filter)=(Filter weight)/(Density of raw material of filter);

(Void rate of filter)={1−(Real volume of filter)/(Apparent volume of filter)}×100 (%).

Initial Trapped Particle Diameter, Initial Pressure Loss and Filter Life:

One filter cartridge was mounted to a housing of a circulating type testing machine for filtering performance, and water was passed to circulate, controlling a flow rate to 30 liter/minute by means of a pump. A pressure loss between the pressures at the inlet and outlet of the filter cartridge was set as an initial pressure loss. Next, a cake prepared by mixing 8 kinds of testing powder I prescribed in JIS Z 8901 (abbreviated as JIS 8 kinds; intermediate diameter: 6.6. to 8.6 μm) with 7 kinds of the same powder (abbreviated as JIS 7 kinds; intermediate diameter: 27 to 31 μm) in a weight ratio of 1:1 was continuously added at 0.4 g/minute, and the original solution and the filtrate were sampled 5 minutes after starting of the addition. They were diluted to prescribed concentrations, and then the numbers of particles contained in the respective solutions were measured by means of a light shielding type particle detector to calculate an initial trapping efficiency in each particle diameter. Further, the value thereof was interpolated to determine a particle diameter showing a trapping efficiency of 80%. The addition of the cake was still continued until the pressure loss of the filter cartridge reached to 0.2 MPa, and the original solution and the filtrate were again sampled to determine a trapped particle diameter. Time consumed from starting addition of the cake until reaching to 0.2 MPa was defined as a filter life. When the pressure difference did not reach to 0.2 MPa even the filter life reached to 1000 minutes, the measurement was discontinued at that point of time. Bubbling of initial filtrate and fiber falling:

One filter cartridge was mounted to a housing of a circulating type testing machine for filtering performance, and ion-exchanged water was passed, controlling a flow rate to 10 liter/minute by means of a pump. One liter of an initial filtrate was sampled, and 25 $cm^3$ thereof was taken into a colorimetric bottle and stirred vigorously to observe bubbling at 10 seconds after stopping the stirring. When a volume of bubble (volume from a liquid surface up to the top of bubble) was 10 $cm^3$ or more, it was judged poor and shown by a symbol "×"; when a volume of bubble was less than 10 $cm^3$, it was judged fair and shown by a symbol "Δ"; and when less than 5 bubbles having a diameter of 1 mm or more were observed, it was judged good and shown by a symbol "○". Further, 500 $cm^3$ of the initial filtrate was passed through a nitrocellulose filter having a pore diameter of 0.8 μm to judge fiber falling, wherein the number of fibers having a length of 1 mm or more per $cm^2$ of the filter paper were 4 or more was judged poor and shown by "×"; the number of 1 to 3 was judged fair and was shown by "Δ"; and the number of 0 was judged good and shown by "○".

EXAMPLE 1

Figure 13:
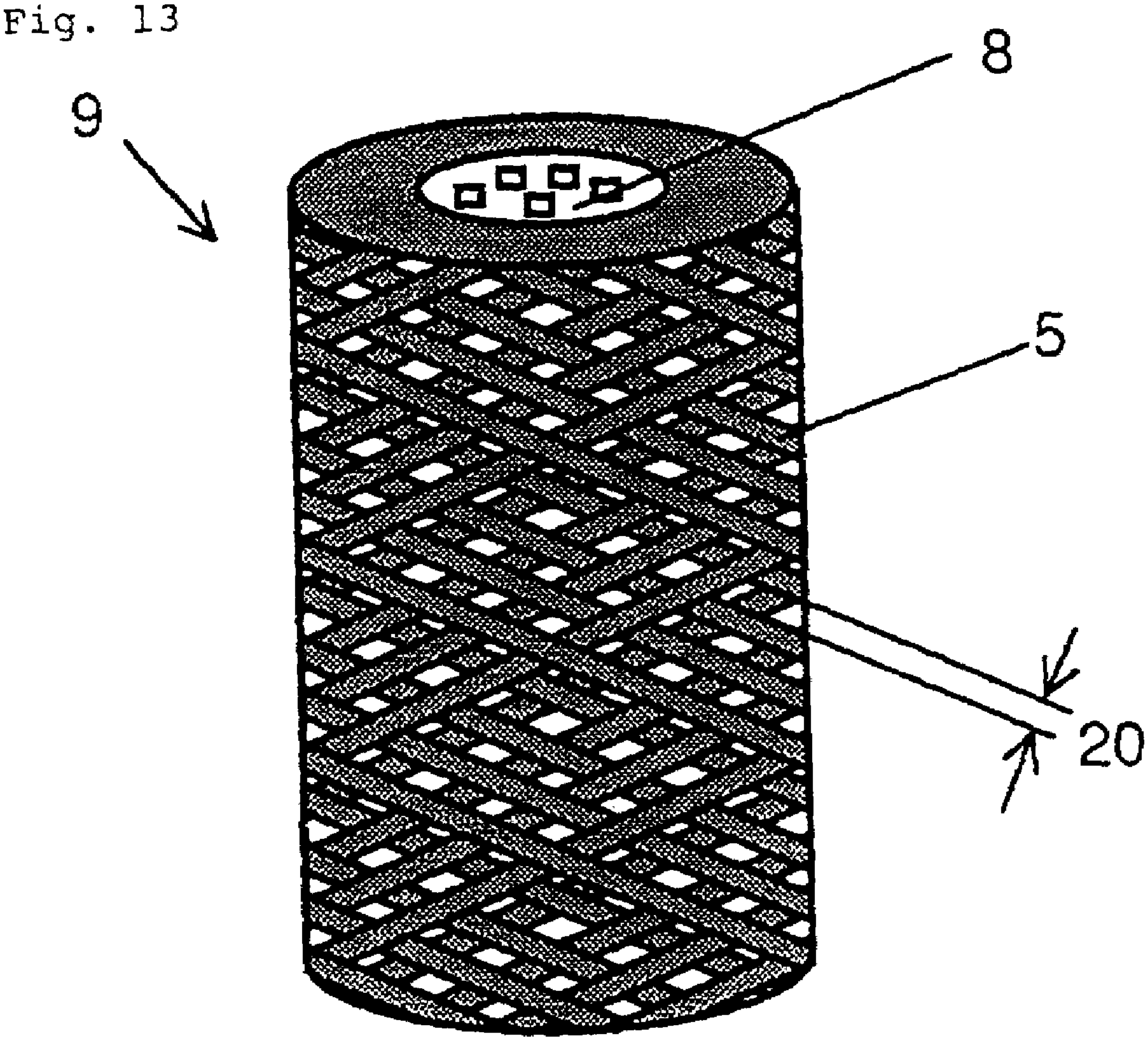
FIG. 13 is a perspective of the filter cartridge according to the present invention.

Used as a long fiber non-woven fabric was a polypropylene spun bonded non-woven fabric having a basis weight of 22 $g/m^2$, a thickness of 200 μm and a fineness of 2 dtex, in which fiber intersections were bonded by heat compression by means of a heat embossing roll. Used for a perforated cylinder was a polypropylene injection-molded article having a minor diameter of 30 mm, a major diameter of 34 mm and a length of 250 mm, and also having 180 holes of 6 mm square. The above non-woven fabric was slit to a width of 50 mm to obtain a strip, long fiber non-woven fabric. A winder was used to wind the strip, long fiber non-woven fabric around the perforated cylinder without converging. It was wound around the perforated cylinder at an initial spindle velocity of 1500 rpm until the major diameter reached to 62 mm, while controlling the winding number to 3 and 3/11 so that a space between the non-woven fabrics was 0 mm, and there was provided a cylindrical filter cartridge 9 as shown in FIG. 13.

EXAMPLE 2

A filter cartridge was obtained in the same manner as in Example 1, except that the winding number was changed to 4 and 3/7. However, the filtering performance was not much different from that of the filter described in Example 1. The reason is considered to be that the strip non-woven fabric was not converged and this does not influence on the winding number.

EXAMPLE 3

The same strip, long fiber non-woven fabric and the same perforated cylinder as used in Example 1 were used. A guide of a circular hole having a diameter of 5 mm was disposed on a yarn passage communicating to the winder to converge the non-woven fabric to a diameter of 5 mm, and it was wound around the perforated cylinder under the same conditions as in Example 1 to obtain a cylindrical filter cartridge. This filter had almost the same filtering performance as that of the filter obtained in Example 1.

EXAMPLE 4

A cylindrical filter cartridge was obtained in the same manner as in Example 3, except that the winding number was changed to 4 and 3/7 so as to set the space between the strip, long fiber non-woven fabrics to 1 mm. This filter had a rougher accuracy, a better liquid-passing property and a longer filter life than those of the filter described in Example 3.

EXAMPLE 5

A cylindrical filter cartridge was obtained in the same manner as in Example 3, except that the winding number was changed to 4 and 2/7 so as to set the space between the strip, long fiber non-woven fabrics to 2 mm. This filter was much rougher than the filter described in Example 4.

EXAMPLE 6

A cylindrical filter cartridge was obtained in the same manner as in Example 3, except that the winding number was changed to 3 and 5/7 so as to set the space between the strip, long fiber non-woven fabrics to 2 mm. This filter was much rougher than the filter described in Example 5.

EXAMPLE 7

A cylindrical filter cartridge was obtained in the same manner as in Example 4, except for changing the raw material resin of the long fiber non-woven fabric to nylon 66. This filter showed almost the same filtering performance as that of the filter described in Example 4.

EXAMPLE 8

A cylindrical filter cartridge was obtained in the same manner as in Example 4, except that the raw material resin of the long fiber non-woven fabric was changed to polyethylene terephthalate. This filter showed almost the same filtering performance as that of the filter described in Example 4.

EXAMPLE 9

A cylindrical filter cartridge was obtained in the same manner as in Example 4, except that the long fiber non-woven fabric was slit to a width of 10 mm and that the winding number was changed to 3 and 10/21 so as to set the yarn space to 1 mm. This filter had almost the same performance as that of the filter described in Example 4. However, time required for winding was longer than in Example 4.

EXAMPLE 10

A cylindrical filter cartridge was obtained in the same manner as in Example 3, except that the long fiber non-woven fabric was slit to a width of 100 mm and that the winding number was changed to 3 and 5/7 so as to set the yarn space to 0 mm. This filter had a rougher accuracy than that of the filter described in Example 3 and showed an accuracy close to that of the filter described in Example 5.

The filter having a rough accuracy was obtained, in spite of setting the yarn space to 0 mm. This is because the strip, long fiber non-woven fabric-converged matter became extremely thick.

EXAMPLE 11

A cylindrical filter cartridge was obtained in the same manner as in Example 4, except that sheath-core type composite fibers comprising high-density polyethylene as a low melting point component and polypropylene as a high melting point component in a weight ratio of 5:5 were used as the structural fibers for the long fiber non-woven fabric. This filter had a more excellent accuracy than that of the filter described in Example 4 and showed such an excellent stability in the filtering accuracy that the trapped particle diameter at 0.2 MPa scarcely changed from the initial trapped particle diameter.

EXAMPLE 12

A cylindrical filter cartridge was obtained in the same manner as in Example 11, except that linear low-density polyethylene (melting point: 125° C.) was used as the low melting point component. This filter had almost the same filtering accuracy as that of the filter obtained in Example 11 and showed a more excellent liquid-passing property than that of the filter described in Example 11.

EXAMPLE 13

A cylindrical filter cartridge was obtained in the same manner as in Example 12, except that a heat compression bonding method for the fiber intersections was changed from the heat embossing roll to a hot blast-circulating type heating apparatus. This filter had a little rougher accuracy than that of the filter described in Example 12.

EXAMPLE 14

A cylindrical filter cartridge was obtained in the same manner as in Example 4, except that the fineness of the long fiber non-woven fabric was changed to 10 dtex. This filter had a rougher accuracy than that of the filter described in Example 4.

EXAMPLE 15

A cylindrical filter cartridge was obtained in the same manner as in Example 4, except that the basis weight of the long fiber non-woven fabric was changed to 44 $g/m^2$. This filter had a rougher accuracy than that of the filter described in Example 4, but showed almost the same accuracy as that of the filter described in Example 10.

EXAMPLE 16

A cylindrical filter cartridge was obtained in the same manner as in Example 4, except that the strip, long fiber non-woven fabric was twisted 100 times per one meter, instead of converging the non-woven fabric. This filter showed almost the same performance as that of the filter described in Example 4.

EXAMPLE 17

Figure 10:
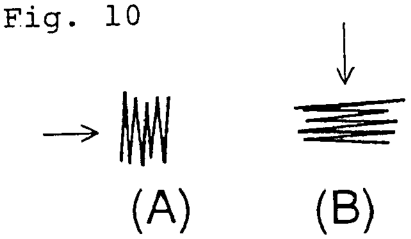
FIG. 10 is an illustration of a cross-sectional shape of a pleated matter with parallel pleats.

A cylindrical filter cartridge was obtained in the same manner as in Example 4, except that the strip, long fiber non-woven fabric was processed to a cross-sectional form as shown in FIG. 10 (A) to obtain a pleated matter having a pleat number of 4 and that the above pleated matter was used for the converged strip, long fiber non-woven fabric. This filter had a little more excellent accuracy than that of the filter described in Example 4, but showed a shorter filter life. The filter life was shorter than that of the filter described in Example 4. This is because the pleated matter had parallel pleats and thus a filtering pressure was applied in a direction vertical to the pleats so that the void rate of the filter is reduced.

EXAMPLE 18

A cylindrical filter cartridge was obtained in the same manner as in Example 17, except that the strip, long fiber non-woven fabric was processed to a cross-sectional form as shown in FIG. 9 (A) to obtain a pleated matter having a pleat number of 7 to be used in the present example. This filter had a little finer accuracy than that of the filter described in Example 4, but was an excellent filter having the same liquid-passing property and filter life as those of the filter described in Example 4.

EXAMPLE 19

A cylindrical filter cartridge was obtained in the same manner as in Example 17, except that the strip, long fiber non-woven fabric was processed to a cross-sectional form as shown in FIG. 9 (C) to obtain a pleated matter having a pleat number of 15 to be used in this example. This filter had a much finer accuracy than that of the filter described in Example 18 but was an excellent filter having the same liquid-passing property and filter life as those of the filter described in Example 4.

EXAMPLE 20

A cylindrical filter cartridge was obtained in the same manner as in Example 19, except that the pleat number of the strip, long fiber non-woven fabric was changed to 41. This filter had a finer accuracy than that of the filter described in Example 19, but was an excellent filter having the same liquid-passing property and filter life as those of the filter described in Example 4.

EXAMPLE 21

A cylindrical filter cartridge was obtained in the same manner as in Example 19, except that the strip, long fiber non-woven fabric was densely converged to control the void rate of the pleated matter to 72%. This filter is rougher than the filter described in Example 19.

COMPARATIVE EXAMPLE 1

A cylindrical filter cartridge was obtained in the same manner as in Example 4, except that polypropylene spun yarns having a diameter of 2 mm obtained by spinning fibers having a fineness of 3 dtex was used in place of the strip, long fiber non-woven fabric and that the yarn space was set to 1 mm. This filter had an initial trapped particle diameter rougher than that of the filter described in Example 4 and almost the same as that of the filter described in Example 5. However, it had an inferior liquid-passing property and a shorter filter life than those of the filter described in Example 5. Further, bubbling was observed in the initial filtrate, and falling of the filter material was observed as well.

COMPARATIVE EXAMPLE 2

A cylindrical filter cartridge was obtained in the same manner as in Example 4, except that a filter paper No. 1 prescribed in JIS P 3801, which was cut to a width of 50 mm, was used in place of the strip, long fiber non-woven fabric. This filter had an initial trapped particle diameter finer than that of the filter described in Example 4 and rougher than that of the filter described in Example 3. However, the initial pressure loss was large, and the trapped particle diameter at an elevated pressure was changed from the initial one to a large extent. Further, the filter life was extremely short, and falling of the filter material was observed in the initial filtrate.

COMPARATIVE EXAMPLE 3 short fibers comprising polypropylene and high-density polyethylene which were dividable to eight parts and had a fineness of 4 dtex were webbed by means of a carding machine, and the webbed matter was subjected to fiber division and fiber entanglement by high pressure water processing to obtain a divided short fiber non-woven fabric having a basis weight of 22 g/m$^2$. This non-woven fabric was observed under an electron microscope to carry out image analysis, which showed that 50% by weight of the whole fibers was divided into a fineness of 0.5 dtex. A cylindrical filter cartridge was obtained in the same manner as in Example 4, except that this non-woven fabric was cut to a width of 50 mm and used in place of the strip, long fiber non-woven fabric. An initial trapped particle diameter in this filter was smaller than that in the filter described in Example 4, but a trapped particle diameter at 0.2 MPa was larger. Further, a little bubbling in the initial filtrate was observed as well as falling of the fibers.

COMPARATIVE EXAMPLE 4

The long fiber non-woven fabric used in Example 1 was slit to a width of 25 cm, and the cut long fiber non-woven fabric was wound around the perforated cylinder in a layer form at a line pressure of 1.5 kg/m as shown in FIG. 1 to obtain a cylindrical filter cartridge. An initial trapped particle diameter in this filter was almost the same as that in the filter described in Example 4, but a trapped particle diameter at 0.2 MPa was larger. The filter life was a little shorter as compared with that in Example 4.

The results obtained in the examples and the comparative examples are shown in Tables 1 and 2.

TABLE 1

| | Long fiber non-woven fabric | | | | | | Processing of non-woven fabric | | |
|---|---|---|---|---|---|---|---|---|---|
| | Basis weight (g/m$^2$) | Thickness (μm) | Fineness (dtex) | Adhesion at intersection | Resin | Slit width (mm) | Cross-sectional form | Pleat number | Void rate (%) |
| Example 1 | 22 | 200 | 2 | Emboss | PP | 50 | None | — | — |
| Example 2 | 22 | 200 | 2 | Emboss | PP | 50 | None | — | — |
| Example 3 | 22 | 200 | 2 | Emboss | PP | 50 | Converged | — | 91 |
| Example 4 | 22 | 200 | 2 | Emboss | PP | 50 | Converged | — | 90 |
| Example 5 | 22 | 200 | 2 | Emboss | PP | 50 | Converged | — | 90 |
| Example 6 | 22 | 200 | 2 | Emboss | PP | 50 | Converged | — | 91 |
| Example 7 | 22 | 200 | 2 | Emboss | Nylon 66 | 50 | Converged | — | 90 |
| Example 8 | 22 | 200 | 2 | Emboss | PET | 50 | Converged | — | 89 |
| Example 9 | 22 | 200 | 2 | Emboss | PP | 10 | Converged | — | 90 |
| Example 10 | 22 | 200 | 2 | Emboss | PP | 100 | Converged | — | 91 |
| Example 11 | 22 | 200 | 2 | Emboss | HDPE/PP | 50 | Converged | — | 90 |
| Example 12 | 22 | 200 | 2 | Emboss | LLDPE/PP | 50 | Converged | — | 90 |
| Example 13 | 22 | 200 | 2 | TA | LLDPE/PP | 50 | Converged | — | 90 |
| Example 14 | 22 | 200 | 10 | Emboss | PP | 50 | Converged | — | 90 |
| Example 15 | 44 | 400 | 2 | Emboss | PP | 25 | Converged | — | 90 |
| Example 16 | 22 | 200 | 2 | Emboss | PP | 50 | Twisted | — | — |
| Example 17 | 22 | 200 | 2 | Emboss | PP | 50 | FIG. 10-(A) | 4 | 90 |
| Example 18 | 22 | 200 | 2 | Emboss | PP | 50 | FIG. 9-(A) | 7 | 95 |
| Example 19 | 22 | 200 | 2 | Emboss | PP | 50 | FIG. 9-(C) | 15 | 90 |
| Example 20 | 22 | 200 | 2 | Emboss | PP | 50 | FIG. 9-(C) | 41 | 91 |
| Example 21 | 22 | 200 | 2 | Emboss | PP | 50 | FIG. 9-(C) | 15 | 72 |

TABLE 1-continued

| | Long fiber non-woven fabric | | | | | Processing of non-woven fabric | | | |
|---|---|---|---|---|---|---|---|---|---|
| | Basis weight ($g/m^2$) | Thickness ($\mu m$) | Fineness (dtex) | Adhesion at intersection | Resin | Slit width (mm) | Cross-sectional form | Pleat number | Void rate (%) |
| Comparative Example 1 | (PP spun yarn used) | | | | PP | | (PP spun yarn used) | | |
| Comparative Example 2 | 90 | 200 | — | (Filter paper No. 1) | Cellulose | 15 | None | — | — |
| Comparative Example 3 | 22 | 200 | 0.5 | WJ | HDPE/PP | 50 | None | — | — |
| Comparative Example 4 | 22 | 200 | 2 | Emboss | PP | (250) | None | — | — |

TABLE 2

| | Winding | | Filtering performance | | | | | |
|---|---|---|---|---|---|---|---|---|
| | Yarn space (mm) | Filter void rate (%) | Initial trapped particle diameter ($\mu m$) | Initial pressure loss (MPa) | Trapped particle diameter in 0.2 MPa ($\mu m$) | Filter life (minute) | Bubbling | Fiber falling |
| Example 1 | 0 | 78 | 7.1 | 0.013 | 8 | 75 | ○ | ○ |
| Example 2 | 1 | 78 | 7.1 | 0.013 | 8 | 75 | ○ | ○ |
| Example 3 | 0 | 78 | 8.2 | 0.011 | 9 | 75 | ○ | ○ |
| Example 4 | 1 | 82 | 13 | 0.003 | 14 | 225 | ○ | ○ |
| Example 5 | 2 | 83 | 17 | 0.001 | 19 | 650 | ○ | ○ |
| Example 6 | 3 | 83 | 30 | 0.001 | 30 | >1000 | ○ | ○ |
| Example 7 | 1 | 82 | 13 | 0.002 | 14 | 220 | ○ | ○ |
| Example 8 | 1 | 82 | 13 | 0.002 | 14 | 220 | ○ | ○ |
| Example 9 | 1 | 81 | 12 | 0.003 | 13 | 220 | ○ | ○ |
| Example 10 | 0 | 83 | 18 | 0.003 | 19 | 660 | ○ | ○ |
| Example 11 | 1 | 81 | 12 | 0.003 | 12 | 230 | ○ | ○ |
| Example 12 | 1 | 81 | 12 | 0.002 | 12 | 230 | ○ | ○ |
| Example 13 | 1 | 82 | 13 | 0.001 | 13 | 250 | ○ | ○ |
| Example 14 | 1 | 83 | 30 | 0.001 | 30 | >1000 | ○ | ○ |
| Example 15 | 1 | 81 | 17 | 0.003 | 18 | 650 | ○ | ○ |
| Example 16 | 1 | 81 | 13 | 0.003 | 14 | 220 | ○ | ○ |
| Example 17 | 1 | 82 | 11 | 0.005 | 11 | 120 | ○ | ○ |
| Example 18 | 1 | 82 | 11 | 0.003 | 12 | 220 | ○ | ○ |
| Example 19 | 1 | 82 | 10.5 | 0.003 | 11 | 225 | ○ | ○ |
| Example 20 | 1 | 82 | 10.0 | 0.003 | 10 | 225 | ○ | ○ |
| Example 21 | 1 | 83 | 30 | 0.001 | 30 | >1000 | ○ | ○ |
| Comparative Example 1 | 1 | 76 | 18 | 0.005 | 22 | 300 | x | x |
| Comparative Example 2 | 1 | 72 | 11 | 0.022 | 20 | 30 | ○ | x |
| Comparative Example 3 | 1 | 77 | 10.1 | 0.010 | 13 | 80 | Δ | x |
| Comparative Example 4 | — | 80 | 12 | 0.005 | 16 | 200 | ○ | ○ |

INDUSTRIAL APPLICABILITY

As described above in detail, the filter cartridge of the present invention is well balanced in terms of properties such as a liquid-passing property, a filter life and a stability in a filtering accuracy as compared with conventional bobbin-winder type filter cartridges and filter cartridges prepared by winding non-woven fabrics in a layer form. In particular, in case of a pleated matter prepared by converging a strip, long fiber non-woven fabric in such a manner that at least a part of the pleats is non-parallel, a filtering pressure in a vertical direction to the pleats is less liable to apply as compared with a pleated matter having parallel pleats. Thus, the pleated matter is not crushed, and the filtering performance can more stably be maintained.

What is claimed is:

1. A filter cartridge comprising a strip, spun bonded non-woven fabric, the fabric comprising a thermoplastic fiber in which at least a part of fiber intersections is thermally adhered by a thermal compression bonding method, wherein the strip, spun bonded non-woven fabric is wound around a perforated cylinder in a twill form.

2. The filter cartridge as described in claim 1, wherein the thermoplastic fiber constituting the spun bonded non-woven fabric is a thermally adhesive composite fiber comprising a low melting point resin and a high melting point resin, the difference in a melting point of both the resins being 10° C. or more.

3. The filter cartridge as described in claim 2, wherein the low melting point resin is linear low density polyethylene and the high melting point resin is polypropylene.

4. The filter cartridge as described in claim 1, wherein the spun bonded non-woven fabric is bonded by thermal compression by means of a heat embossing roll.

5. The filter cartridge as described in claim 1, wherein the strip, spun bonded non-woven fabric is twisted.

6. The filter cartridge as described in claim 1, wherein the strip, spun bonded non-woven fabric is formed into a pleated matter having 4 to 50 pleats and wound around said perforated cylinder in a twill form.

7. The filter cartridge as described in claim 6, wherein at least a part of the pleats of said pleated matter is non-parallel.

8. The filter cartridge as described in claim 6, wherein the pleated matter has a void rate of 60 to 95%.

9. The filter cartridge as described in claim 1, wherein the filter cartridge has a void rate of 65 to 85%.

10. The filter cartridge as described in claim 1, wherein the strip of the spun bonded non-woven fabric has a width of 0.5 cm or more, and a product of the width (cm) and the basis weight ($g/m^2$) is 200 or less.

11. The filter cartridge as described in claim 1, wherein the filter cartridge has a ratio of trapped particle diameter in 0.2 MPa/initial trapped particle diameter being 1–1.13 when initial trapped particle diameter is 7.1 to 30 $\mu$m.

12. The filter cartridge as described in claim 1, wherein the spun bonded non-woven fabric is bonded by thermal compression by means of a heat flat calendar roll.

* * * * *